(12) United States Patent
Kataoka et al.

(10) Patent No.: US 7,060,740 B2
(45) Date of Patent: *Jun. 13, 2006

(54) CLEAR INK COMPOSITION, INK SET, AND INK JET RECORDING METHOD USING THE SAME

(75) Inventors: Shuichi Kataoka, Nagano (JP); Kiyohiko Takemoto, Nagano (JP); Shinichi Kato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 10/387,227

(22) Filed: Mar. 12, 2003

(65) Prior Publication Data

US 2003/0189626 A1  Oct. 9, 2003

(30) Foreign Application Priority Data

Mar. 15, 2002 (JP) .............................. 2002-073165
Jan. 16, 2003 (JP) .............................. 2003-008763

(51) Int. Cl.
*C09D 11/10* (2006.01)
*C08L 33/02* (2006.01)
*C08L 23/12* (2006.01)
*C08L 81/00* (2006.01)
*B41J 2/01* (2006.01)

(52) U.S. Cl. ...................... 523/160; 524/556; 524/582; 524/609; 347/98

(58) Field of Classification Search ................ 523/160, 523/161; 106/31.27, 31.28, 31.6; 524/609, 524/556, 582
See application file for complete search history.

(56) References Cited

U.S. PATENT DOCUMENTS

| 4,172,064 | A | * | 10/1979 | Keeler ........................ 524/762 |
| 5,623,294 | A | * | 4/1997 | Takizawa et al. ............. 347/98 |
| 5,640,187 | A | * | 6/1997 | Kashiwazaki et al. ...... 347/101 |
| 5,990,227 | A | * | 11/1999 | Takizawa et al. ........... 524/517 |
| 6,152,999 | A | * | 11/2000 | Erdtmann et al. ......... 106/31.6 |
| 6,312,510 | B1 | * | 11/2001 | Kamagata et al. ......... 106/31.6 |
| 6,417,248 | B1 | * | 7/2002 | Gore ........................... 523/160 |
| 6,439,708 | B1 | * | 8/2002 | Kato et al. ..................... 347/98 |
| 6,450,632 | B1 | * | 9/2002 | Tsang et al. ................... 347/96 |
| 2002/0156153 | A1 | * | 10/2002 | Tsang et al. ................ 523/160 |
| 2003/0193553 | A1 | * | 10/2003 | Issler ........................ 347/100 |
| 2004/0032473 | A1 | * | 2/2004 | Ishimoto et al. ............ 347/100 |
| 2004/0092621 | A1 | * | 5/2004 | Kataoka et al. ............. 523/160 |

FOREIGN PATENT DOCUMENTS

| EP | 1106658 A2 | * | 6/2001 |
| EP | 1145865 A2 | * | 10/2001 |
| JP | 02-227403 A | | 9/1990 |
| JP | 11-217525 A | | 8/1999 |
| JP | 2001-277488 A | | 10/2001 |

OTHER PUBLICATIONS

Shin-Jikken-Kagaku Koza (New Experimental Chemistry Course), vol. 14, p. III. 173, (1978).

* cited by examiner

*Primary Examiner*—Callie Shosho
(74) *Attorney, Agent, or Firm*—Ladas & Parry LLP

(57) ABSTRACT

Ink jet recording is carried out using an ink set comprising a clear ink composition that contains polymer fine particles and does not contain a colorant, a yellow ink composition, a magenta ink composition, a cyan ink composition, a red ink composition, a violet ink composition, and a black ink composition, whereby a high-quality recorded article having excellent recorded image coloration and glossiness can be obtained.

30 Claims, No Drawings

CLEAR INK COMPOSITION, INK SET, AND INK JET RECORDING METHOD USING THE SAME

BACKGROUND OF THE INVENTION

1. Field of the Invention

The present invention relates to a clear ink composition, an ink set, an ink cartridge, an ink jet recording method, and a recorded article, and in particular to an ink set and so on according to which a recorded article having excellent recorded image coloration and glossiness can be provided.

2. Description of the Related Art

An ink jet recording method is a printing method in which recording is carried out by making droplets of ink compositions fly onto a recording medium such as paper. This method has the distinctive characteristic that vivid high-resolution images can be printed at high speed while using a relatively inexpensive apparatus.

From hitherto, various ink sets comprising ink compositions for use in recording using such an ink jet recording method have been proposed.

In recent years, there have been increased demands for recorded images of higher quality, and hence various measures have been taken to further improve the coloration and glossiness of recorded images.

However, recorded articles having sufficiently good recorded image coloration and glossiness have not yet been provided.

For example, printing ink binders containing modified polypropylene (Japanese Patent Application Laid-open No. H08-12913), colored pigment inks containing modified polypropylene (Japanese Patent Application Laid-open No. H09-31386) and so on have been proposed hitherto, but these differ from clear inks, and do not improve the coloration and glossiness of recorded images.

Moreover, as art for improving the glossiness of recorded images, for example in Japanese Patent Application Laid-open No. 2001-277488, a recording method is proposed in which at least two types of black ink having a different density to one another and an ink that does not contain a colorant are used, and the ink that does not contain a colorant is used only in parts where the black inks are not printed; however, with this method, not only can color images not be obtained, but moreover there is a problem that the coloration and glossiness of recorded images cannot be sufficiently improved.

SUMMARY OF THE INVENTION

It is thus an object of the present invention to provide a clear ink composition, an ink set, an ink cartridge, an ink jet recording method and a recorded article, according to which a color recorded article having excellent recorded image coloration and glossiness can be provided.

The present inventors carried out assiduous studies, and as a result discovered that by using an ink set that comprises a clear ink composition that contains polymer fine particles having a specified structure and does not contain a colorant, and at least a yellow ink composition, a magenta ink composition, and a cyan ink composition, a recorded article having excellent recorded image coloration and glossiness can be obtained.

Specifically, a clear ink composition of the present invention that is useful in such an ink set is characterized by containing polymer fine particles and not containing a colorant.

The polymer fine particles are preferably polymer fine particles of at least one type selected from the group consisting of (i) sulfonic acid group-containing polymers (sol type resins), (ii) modified polypropylene emulsions, (iii) copolymers obtained by polymerizing, in the presence of alcoholic hydroxyl group-containing water-soluble macromolecular compound(s) or copolymerizable surfactant(s), ethylenic unsaturated carboxylic acid monomer(s) and other monomer(s) copolymerizable therewith, and (iv) emulsified resins having a particle diameter of at least 70 nm.

In particular, in the case that the clear ink composition contains any of (i) to (iv) as the polymer fine particles, it is preferable for the clear ink composition to contain both (i) and (ii), or both (ii) and (iii), as the polymer fine particles.

The ink set of the present invention is characterized by comprising a clear ink composition as described above, and at least a yellow ink composition, a magenta ink composition, and a cyan ink composition.

Alternatively, the ink set of the present invention is characterized by comprising a clear ink composition that contains polymer fine particles and contains up to 0.4 wt % of a colorant, and at least a yellow ink composition, a magenta ink composition, and a cyan ink composition.

The ink set can be used in ink jet recording.

An ink cartridge of the present invention houses an ink set as described above.

Moreover, an inkjet recording method of the present invention is characterized by using a clear ink composition as described above, and a yellow ink composition, a magenta ink composition and a cyan ink composition, or using an ink set as described above, and carrying out recording by attaching the various ink compositions onto a recording medium.

In this specification, 'duty' is the value calculated using the following equation.

$$\text{Duty (\%)} = [\text{number of dots actually printed}/(\text{vertical resolution} \times \text{horizontal resolution})] \times 100$$

(In the equation, 'number of dots actually printed' is the number of dots actually printed per unit area, and 'vertical resolution' and 'horizontal resolution' are the respective resolutions per unit area. '100% duty' corresponds to the maximum weight of ink of a single color for the pixels.)

DESCRIPTION OF THE PREFERRED EMBODIMENTS

Following is a description of preferable embodiments of a clear ink composition and an ink set of the present invention.

An ink set of the present invention comprises a clear ink composition that contains polymer fine particles having a specified structure and does not contain a colorant, and at least a yellow ink composition, a magenta ink composition, and a cyan ink composition.

Because the ink set of the present invention contains a clear ink composition in addition to colored ink compositions, by carrying out recording using the ink set, recorded images having excellent coloration and glossiness can be obtained. In the case of using specialist paper in particular, the clear ink composition can be attached in parts where printing is not carried out using the colored ink compositions and low-duty parts, and hence the glossiness of these unprinted parts and low-duty parts can be improved. Moreover, by carrying out printing using the clear ink composition, the colored ink compositions can be attached uniformly, and hence the coloration is improved. With plain paper in particular, white mottle can be prevented, and high chroma with low lightness can be realized, and hence the color reproduction ability is markedly improved. Because the color reproduction ability is improved, the weight of colored inks attached to the plain paper and the pigment contents of the colored inks can be reduced. Consequently, by using the ink set of the present invention, an improvement in the glossiness with specialist paper and an improvement in the coloration with plain paper can both be realized.

In this way, the clear ink composition of the present invention is useful when used in an ink set, and moreover the clear ink composition has excellent storability.

The above-mentioned polymer fine particles are preferably made to undergo colloidal dispersion to form an emulsion in the clear ink composition. Specifically, the polymer fine particles are preferably added into the clear ink composition in the form of an emulsion.

By making the polymer fine particles undergo colloidal dispersion to form an emulsion in the clear ink composition, the transparency of the clear ink composition is increased, and hence recorded images of higher quality can be obtained.

From the viewpoint of improving the glossiness and improving the stability of recorded images, the polymer fine particles are preferably polymer fine particles of at least one type selected from the group consisting of (i) sulfonic acid group-containing polymers (sol type resins), (ii) modified polypropylene emulsions, (iii) copolymers obtained by polymerizing, in the presence of alcoholic hydroxyl group-containing water-soluble macromolecular compound(s) or copolymerizable surfactant(s), ethylenic unsaturated carboxylic acid monomer(s) and other monomer(s) copolymerizable therewith, and (iv) emulsified resins having a particle diameter of at least 70 nm.

(i)

The above-mentioned sulfonic acid group-containing polymers are preferably dienic sulfonic acid group-containing polymers and/or non-dienic sulfonic acid group-containing polymers.

Such a sulfonic acid group-containing polymer is a polymer obtained by sulfonating a polymer or copolymer obtained through homopolymerization or copolymerization of monomer(s) as described below (see Japanese Patent Application Laid-open No. 11-217525), or a polymer obtained through homopolymerization or copolymerization of monomer (s) that has/have been sulfonated; there are dienic sulfonic acid group-containing polymers which have a dienic monomer as an essential component thereof, and non-dienic sulfonic acid group-containing polymers which do not have a dienic monomer as an essential component thereof.

As monomers used for obtaining the above-mentioned dienic sulfonic acid group-containing polymers, there are dienic monomers, and other monomers that can be used together with dienic monomers.

Examples of dienic monomers include dienic compounds having 4 to 10 carbon atoms, for example 1,3-butadiene, 1,2-butadiene, 1,3-pentadiene, 1,2-pentadiene, 2,3-pentadiene, isoprene, 1,2-hexadiene, 1,3-hexadiene, 1,4-hexadiene, 1,5-hexadiene, 2,3-hexadiene, 2,4-hexadiene, 2,3-dimethyl-1,3-butadiene, 2-ethyl-1,3-butadiene, 1,2-heptadiene, 1,3-heptadiene, 1,4-heptadiene, 1,5-heptadiene, 1,6-heptadiene, 2,3-heptadiene, 2,5-heptadiene, 3,4-heptadiene, 3,5-heptadiene, and cycloheptadiene. One of these dienic monomers can be used, or two or more can be used together.

Examples of other monomers that can be used together with dienic monomers include aromatic monomers such as styrene, α-methylstyrene, o-methylstyrene, p-methylstyrene, m-methylstyrene, and vinylnaphthalene, (meth)acrylic acid alkyl esters such as methyl(meth)acrylate, ethyl(meth)acrylate, and butyl(meth)acrylate, mono- and di-carboxylic acids such as (meth)acrylic acid, crotonic acid, maleic acid, and itaconic acid, and also anhydrides of dicarboxylic acids, vinyl cyanide compounds such as (meth)acrylonitrile, and unsaturated compounds such as vinyl chloride, vinylidene chloride, vinyl methyl ethyl ketone, vinyl acetate, (meth) acrylamide, and glycidyl (meth)acrylate.

In the case of using such other monomer(s) together with the dienic monomer(s), the amount used of the dienic monomer(s) is preferably at least 0.5 wt %, more preferably at least 1 wt %, yet more preferably at least 5 wt %.

A dienic copolymer obtained through copolymerization of dienic monomer(s) and other monomer(s) that can be used together with dienic monomers as described above may be any kind of copolymer, including a random copolymer or a block copolymer.

Examples of preferable polymers include isoprene homopolymers, butadiene homopolymers, isoprene-styrene random copolymers, isoprene-styrene block copolymers, styrene-isoprene-styrene ternary block copolymers, butadiene-styrene random copolymers, butadiene-styrene block copolymers, styrene-butadiene-styrene block copolymers, styrene-butadiene-styrene ternary block copolymers, and ethylene-propylene-diene ternary block copolymers. Examples of particularly preferable copolymers include isoprene-styrene block copolymers, styrene-isoprene-styrene ternary block copolymers, butadiene-styrene block copolymers, styrene-butadiene-styrene block copolymers, and styrene-butadiene-styrene ternary block copolymers.

A dienic sulfonic acid group-containing polymer used in the present invention may be one obtained by sulfonating, using a publicly known sulfonation method such as that disclosed in Shin-Jikken-Kagaku Koza ('New Experimental Chemistry Course') (vol 14, page III. 1773) edited by the Chemical Society of Japan, or that disclosed in Japanese Patent Application Laid-open No. 2-227403, a dienic polymer as described above and/or a polymer obtained by hydrogenating some or all of the residual double bonds originating from the precursor monomer(s) of a dienic polymer as described above.

Examples of sulfonating agents include sulfuric anhydride, sulfuric acid, chlorosulfonic acid, oleum, and hydrogensulfites (of Li, Na, K, Rb, Cs, etc.). The amount used of the sulfonating agent is preferably in a range of 0.005 to 1.5 mol, more preferably in a range of 0.01 to 1.0 mol, in terms of sulfuric anhydride per 1 mol of the polymer.

It is preferable to use the dienic sulfonic acid group-containing polymer in a state obtained by subsequently making water and/or basic compound(s) act on the sulfonated product obtained as described above. Examples of basic compounds include alkali metal hydroxides, alkali metal alkoxides, alkali metal carbonates, ammonia water, organometallic compounds, and amines. One basic compound can be used, or two or more can be used together. The amount used of the basic compound(s) is not more than 2 mol, preferably not more than 1.3 mol, per 1 mol of the sulfonating agent used.

Examples of monomers used for obtaining non-dienic sulfonic acid group-containing polymers include monomers having a sulfonyl group, for example vinyl monomers such as allylsulfonic acid, vinylsulfonic acid, and methacrylsulfonic acid, which is obtained by reacting together isobutylene and sulfur trioxide, styrene type monomers such as sodium p-styrene sulfonate (e.g. SUPIROMAA made by Tosoh Corporation), and methacrylic acid ester type monomers represented by the general formula $CH_2=C(CH_3)-COO(AO)_nSO_3Na$ (A: lower alkylene group) (e.g. Eleminol RS-30 made by Sanyo Chemical Industries, Ltd.), and also sodium salts, potassium salts, lithium salts and so on of the above monomers.

A non-dienic sulfonic acid group-containing polymer can also be obtained by copolymerizing monomer(s) not containing a sulfonic acid group with monomer(s) as described above having a sulfonic acid group.

Examples of the other copolymerizable monomers not containing a sulfonic acid group include aromatic monovinyl compounds such as styrene, ethyl vinyl benzene, α-methylstyrene, fluorostyrene, and vinylpyridine, acrylic acid ester monomers such as butyl acrylate, 2-ethylhexyl acrylate, β-methacryloyloxyethyl hydrogen phthalate, and N,N'-dimethylamino ethyl acrylate, methacrylic acid ester monomers such as 2-ethylhexyl methacrylate, methoxy diethyleneglycol methacrylate, methoxy polyethyleneglycol methacrylate, methyl methacrylate, ethyl methacrylate, butyl methacrylate, N, N'-dimethylamino ethyl methacrylate, and glycidyl methacrylate, vinyl cyanide compounds such as acrylonitrile and methacrylonitrile, silicone-modified monomers, and macromonomers. Furthermore, other examples are compounds containing conjugated double bonds such as butadiene and isoprene, vinyl ester compounds such as vinyl acetate, 4-methyl-1-pentene, and other α-olefin compounds. Out of these copolymerizable monomers, styrene, methyl methacrylate, and acrylonitrile are preferable.

The amount used of the copolymerizable monomer (s) is generally in a range of 1 to 93 wt %, preferably in a range of 5 to 80 wt %, of the polymerizable monomers.

A non-dienic sulfonic acid group-containing polymer is obtained through the radical polymerization of sulfonic acid group-containing monomer(s) as described above, or sulfonic acid group-containing monomer(s) as described above and other copolymerizable monomer(s) as described above, in, for example, a solvent for polymerization such as water or an organic solvent, using a radical polymerization initiator, a chain transfer agent or the like.

A non-dienic sulfonic acid group-containing polymer obtained by copolymerizing non-dienic monomers as described above may be any kind of copolymer, including a random copolymer or a block copolymer.

An acrylic type sulfonic acid group-containing polymer is particularly preferable as a non-dienic sulfonic acid group-containing polymer.

From the viewpoint of improving the glossiness and improving the stability of recorded images, the polymer fine particles preferably have an acid value of at least 100.

From the viewpoint of improving the glossiness and improving the stability of recorded images, the polymer fine particles preferably have a weight average molecular weight (Mw) in a range of 8,000 to 20,000 inclusive, and a glass transition temperature (Tg; measured in accordance with JIS K6900) in a range of 5° C. to 50° C. inclusive.

From the viewpoint of improving the glossiness and improving the stability of recorded images, the polymer fine particles preferably have a minimum film formation temperature (MFT) of not more than 20° C.

The polymer fine particles preferably have a particle diameter of not more than 70 nm. More preferably, the polymer fine particles have a particle diameter in a range of 20 to 70 nm inclusive. If the particle diameter of the polymer fine particles is in this range, then the polymer fine particles readily form an emulsion in water, and hence a clear ink composition having high transparency can be obtained, and thus high-quality recorded images can be obtained.

(ii)

From the viewpoint of improving the glossiness and improving the stability of recorded images, the above-mentioned modified polypropylene emulsions are preferably emulsions obtained by modifying polypropylene having a weight average molecular weight (Mw) in a range of 1,000 to 50,000 inclusive with an unsaturated carboxylic acid or an anhydride thereof, and then dispersing the modified polypropylene in water in the presence of a basic compound and an emulsifier.

The unsaturated carboxylic acid and/or anhydride thereof is preferably maleic acid and/or maleic anhydride.

Examples of the modified polypropylene emulsions of the present invention are ones obtained by modifying low-molecular-weight polypropylene by, for example, a publicly known method using a thermal reaction or an organic peroxide. For example, in an inert gas atmosphere, low-molecular-weight polypropylene is heated and thus dissolved in the presence of an aromatic solvent or a chlorinated solvent, or in the presence of a peroxide type radical-generating catalyst, and is modified by grafting on an unsaturated carboxylic acid and/or an anhydride thereof.

(iii)

From the viewpoint of improving the glossiness and improving the stability of recorded images, the above-mentioned copolymers obtained by polymerizing, in the presence of alcoholic hydroxyl group-containing water-soluble macromolecular compound(s) or copolymerizable surfactant(s), ethylenic unsaturated carboxylic acid monomer(s) and other monomer(s) copolymerizable therewith (these copolymers are also referred to as 'alkali-soluble resins') preferably have an acid value of not more than 40.

It is preferable for the above-mentioned copolymers to have had the pH thereof adjusted using a base.

The base is preferably an inorganic base.

The inorganic base is preferably an alkali metal hydroxide or an alkaline earth metal hydroxide.

From the viewpoint of improving the glossiness and improving the stability of recorded images, the copolymers preferably have a glass transition temperature (Tg; measured in accordance with JIS K6900) of not more than 70° C. This glass transition temperature is more preferably not more than 50° C., yet more preferably not more than 10° C.

Specifically, out of water-soluble macromolecular compounds, ones containing 5 to 25 alcoholic hydroxyl groups per 1,000 of the molecular weight are preferable; examples include vinyl alcohol type polymers such as polyvinyl alcohols and various modified polyvinyl alcohols; saponified copolymers between vinyl acetate and acrylic acid, methacrylic acid or maleic anhydride; cellulose derivatives such as alkyl celluloses, hydroxyalkyl celluloses, and alkyl hydroxyalkyl celluloses; starch derivatives such as alkyl starches, and carboxymethyl starch; gum arabic, and gum traganth; and polyalkylene glycols. One of these alcoholic hydroxyl group-containing water-soluble macromolecular compounds can be used, or two or more can be used together.

From the viewpoint of improving the glossiness and improving the stability of recorded images, it is preferable for the alcoholic hydroxyl group-containing water-soluble macromolecular compound(s) to be vinyl alcohol type polymer(s).

Examples of the above-mentioned ethylenic unsaturated carboxylic acid monomer(s) include ethylenic unsaturated monocarboxylic acid monomers such as acrylic acid, and methacrylic acid; ethylenic unsaturated polyvalent carboxylic acid monomers such as itaconic acid, maleic acid, fumaric acid, and butene tricarboxylic acid; ethylenic unsaturated polyvalent carboxylic acid partial ester monomers such as monobutyl fumarate, monobutyl maleate, and mono-2-hydroxypropyl maleate; and polyvalent carboxylic acid anhydrides such as maleic anhydride, and citraconic anhydride. One of these monomers can be used, or two or more can be used together.

From the viewpoint of improving the glossiness and improving the stability of recorded images, it is preferable for the ethylenic unsaturated carboxylic acid monomer(s) to be acrylic acid and/or methacrylic acid.

There are no particular limitations on the other monomer(s) copolymerizable with the ethylenic unsaturated carboxylic acid monomer(s); examples include aromatic vinyl monomers such as styrene, α-methylstyrene, vinyltoluene, and chlorostyrene; (meth)acrylic acid ester monomers such as methyl (meth)acrylate, ethyl (meth)acrylate, propyl(meth)acrylate, n-amyl(meth)acrylate, isoamyl(meth) acrylate, hexyl(meth)acrylate, ethylhexyl (meth)acrylate, octyl(meth)acrylate, hydroxyethyl(meth)acrylate, hydroxypropyl(meth)acrylate, and glycidyl(meth)acrylate; cyano group-containing ethylenic unsaturated monomers such as (meth)acrylonitrile; ethylenic unsaturated glycidyl ether monomers such as allyl glycidyl ether; ethylenic unsaturated amide monomers such as (meth)acrylamide, N-methylol (meth)acrylamide, and N-butoxymethyl(meth)acrylamide, conjugated diene monomers such as 1,3-butadiene, isoprene, 2,3-dimethyl-1,3-butadiene, and 1,3-pentadiene; and carboxylic acid vinyl ester monomers such as vinyl acetate. One of these monomers can be used, or two or more can be used together.

From the viewpoint of improving the glossiness and improving the stability of recorded images, it is preferable for the other monomer(s) copolymerizable with the ethylenic unsaturated carboxylic acid monomer(s) to be ethylenic unsaturated carboxylic acid ester monomer(s).

Each of the above-mentioned copolymerizable surfactant(s) is a surfactant having at least one polymerizable vinyl group in the molecule thereof; examples include anionic polymerizable surfactants such as sodium propenyl-2-ethylhexylsulfosuccinate, (meth)acrylic acid polyoxyethylene sulfuric acid ester, polyoxyethylene alkylpropenyl ether sulfuric acid ester ammonium salts, and (meth)acrylic acid polyoxyethylene ester phosphoric acid ester; and anionic polymerizable surfactants such as polyoxyethylene alkylbenzene ether(meth)acrylic acid esters, and polyoxyethylene alkyl ether(meth)acrylic acid esters. Of these, polyoxyethylene alkylpropenyl ether sulfuric acid ester ammonium salts are preferable, this being due to the balance between the ability to emulsify and disperse the monomer(s) and the ability to copolymerize with the monomer(s) being excellent. One of these copolymerizable surfactants can be used, or two or more can be used together.

From the viewpoint of improving the glossiness and improving the stability of recorded images, it is preferable for the polymer fine particles to have a weight average molecular weight (Mw) in a range of 1,000 to 1,000,000 inclusive, more preferably in a range of 8,000 to 20,000 inclusive. Note that to adjust the weight average molecular weight of the alkali-soluble resin, a chain transfer agent can be used during the polymerization as required.

From the viewpoint of improving the glossiness and improving the stability of recorded images, the polymer fine particles preferably have a pH in a range of 8 to 11 inclusive, more preferably in a range of 9 to 10 inclusive.

From the viewpoint of improving the glossiness and improving the stability of recorded images, the polymer fine particles preferably have a turbidity of not more than 30 mg/l.

From the viewpoint of improving the glossiness and improving the stability of recorded images, the polymer fine particles preferably have a minimum film formation temperature (MFT) of not more than 20° C.

(iv)

The above-mentioned emulsified resins preferably have a particle diameter of at least 70 nm. More preferably, this particle diameter is in a range of 100 to 150 nm inclusive. If the particle diameter of the polymer fine particles is in this range, then the polymer fine particles readily form an emulsion in water, and hence a clear ink composition having high transparency can be obtained, and thus high-quality recorded images can be obtained.

From the viewpoint of improving the glossiness and improving the stability of recorded images, the emulsified resins preferably have a glass transition temperature (Tg; measured in accordance with JIS K6900) of not more than 20° C.

From the viewpoint of improving the glossiness and improving the stability of recorded images, the content of the polymer fine particles in the clear ink composition is preferably in a range of 0.05 wt % to 10.0 wt % inclusive out of the clear ink composition More preferably, this content is in a range of 0.1 wt % to 5.0 wt % inclusive, yet more preferably in a range of 0.1 wt % to 2.0 wt % inclusive. Note that the weight of the polymer fine particles here is the weight in terms of the solid component.

One of the types of polymer fine particles described above may be added to the clear ink composition, or two or more types may be added mixed together. In the case of adding two or more types mixed together, the total content of the various types of polymer fine particles is preferably in a range of 0.05 wt % to 10.0 wt % inclusive out of the clear ink composition, more preferably in a range of 0.1 wt % to 5.0 wt % inclusive (yet more preferably in a range of 0.1 wt % to 2.0 wt % inclusive.

An ink set of the present invention comprises a clear ink composition as described in any of the above, and at least a yellow ink composition, a magenta ink composition, and a cyan ink composition.

The ink set preferably further contains a red ink composition having a hue angle corresponding to a mixed color between the yellow ink composition and the magenta ink composition.

Moreover, the ink set of the present invention preferably further contains a violet ink composition having a hue angle corresponding to a mixed color between the magenta ink composition and the cyan ink composition.

By containing such a red ink composition and/or such a violet ink composition, an ink set that is excellent in terms of graininess can be obtained. It is thought that this is due to the content of the solid pigment component in the magenta and cyan ink compositions being reduced.

Furthermore, the ink set may further contain a black ink composition.

By adopting the above constitution, the coloration and glossiness of recorded images is further improved.

In the clear ink composition described above, water is used as a solvent. Any of pure waters such as ion exchange water, ultrafiltrated water, reverse osmotic water or distilled water, or ultrapure water can be preferably used as the water. Moreover, it is particularly preferable to use such a water that has been subjected to sterilization treatment by irradiating with ultraviolet rays, adding hydrogen peroxide or the like, since then the growth of mold and bacteria can be suppressed.

The clear ink composition may further contain any of acetylenic glycol type compound(s), acetylenic alcohol type compound(s) and polysiloxane type compound(s) as surfactant(s).

As a result, the discharge stability of the clear ink composition can be increased, without bringing about a deterioration in the coloration and glossiness. It is thought that the discharge stability increases because these surfactants reduce the surface tension of the clear ink composition, thus promoting penetration of the clear ink composition into the recording medium.

The surfactant content is preferably in a range of 0.1 to 3.0 wt % inclusive, more preferably in a range 0.1 to 1.0 wt % inclusive, out of the clear ink composition.

From the viewpoint of improving the discharge stability, the surface tension of the clear ink composition is preferably in a range of 15 to 45 dyn/cm inclusive, more preferably in a range of 20 to 30 dyn/cm inclusive.

As acetylenic glycol type compounds, commercially sold ones such as Olfine E1010, STG and Y (all trade names, made by Nissin Chemical Industry Co., Ltd.), and Surfinol 82, 104, 440, 465 and 485 (all trade names, made by Air Products and Chemicals Inc.) can be used.

As acetylenic alcohol type compounds, for example 3,5-diemthyl-1-hexyne-3-ol, 2,4-diemthyl-5-hexyne-3-ol, and Surfinol 61 (trade name, made by Air Products and Chemicals Inc.) can be used.

As polysiloxane type compounds, for example compounds represented by undermentioned formula (2) can be used.

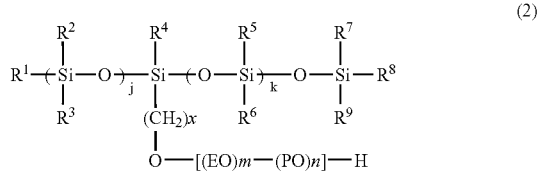

(2)

(In formula (2), $R^1$ to $R^9$ each independently represents an alkyl group having 1 to 6 carbon atoms; j, k and x each independently represents an integer from 1 upwards; EO represents an ethyleneoxy group; PO represents a propyleneoxy group; m and n each represents an integer from 0 upwards, with the proviso that m+n represents an integer from 1 upwards; and in the square brackets there is no limitation on the order of the EO's and PO's, with a random order or blocks being possible.)

The clear ink composition may further contain glycol ether type compound(s) and/or alkyl diol type compound(s). By using such compounds as a solvent, the image quality of recorded images can be increased, without bringing about a deterioration in the coloration and glossiness. From the viewpoint of improving the image quality, the total content of these compounds is preferably in a range of 1.0 to 30 wt % inclusive, more preferably in a range 1.0 to 10 wt % inclusive, out of the clear ink composition.

Examples of glycol ether type compounds include triethylene glycol monobutyl ether, diethylene glycol monobutyl ether, propylene glycol monomethyl ether, diethylene glycol monoethyl ether, and diethylene glycol monomethyl ether. Triethylene glycol monobutyl ether is particularly preferable.

Examples of alkyl diol type compounds include 1,2-hexanediol and 1,2-pentanediol. 1,2-hexanediol is particularly preferable.

The clear ink composition may further contain polyhydric alcohol type compound(s). Examples of polyhydric alcohol type compounds are water-soluble organic solvents such as glycerol, ethylene glycol, triethylene glycol, propylene glycol, diethylene glycol, pentamethylene glycol, trimethylene glycol, 2-butene-1,4-diol, 2-ethyl-1,3-hexanediol, 2-methyl-2,4-pentanediol, dipropylene glycol, and tetraethylene glycol. Glycerol is particularly preferable.

The total content of the polyhydric alcohol type compound(s) is preferably in a range of 5.0 to 40 wt % inclusive, more preferably in a range 10 to 30 wt % inclusive, out of the clear ink composition.

The ink set of the present invention contains colored ink compositions such as a yellow ink composition (Y), a magenta ink composition (M), and a cyan ink composition (C). Colorants, dispersants and so on that are contained in conventional colored ink compositions for ink jet recording can be used in these colored ink compositions with no particular limitations thereon.

Yellow pigment(s) can be suitably used as the colorant(s) in the yellow ink composition (Y). Examples of such yellow pigments include C.I. Pigment Yellows 74, 81, 83, 93, 109, 110, 120, 128, 138, 139, 150, 151, 154, 155, 173, 180, 185 and 195.

As the yellow ink composition, one having a hue angle on a recording medium in a range of 80° to 110° as defined in CIELAB color space (CIE 1976 (L*a*b*) color system, JIS Z 8729) is preferable.

Magenta pigment(s) can be suitably used as the colorant(s) in the magenta ink composition (M). Preferable examples of such magenta pigments include C.I. Pigment Reds 122, 202, 209, 112, 123, 168, 184, 5, 7, 12, 48 (Ca), 48 (Mn), 57 (Ca) and 57:1, and C.I. Pigment Violet 19, with C.I. Pigment Reds 122 and 202 being particularly preferable.

As the magenta ink composition, one having a hue angle in a range of 330° to 360° as defined in the above-mentioned CIELAB color space is preferable.

Cyan pigment(s) can be suitably used as the colorant(s) in the cyan ink composition (C). Preferable examples of such cyan pigments include C.I. Pigment Blues 15:3, 15:4, 60, 1, 2, 3, 16, 22 and 15:34, with C.I. Pigment Blue 15:3 being particularly preferable.

As the cyan ink composition, one having a hue angle in a range of 230° to 260° as defined in the above-mentioned CIELAB color space is preferable.

Red pigment(s) giving a hue angle corresponding to a mixed color between the yellow ink composition and the magenta ink composition can be suitably used as colorant(s) in a red ink composition (R). Examples of such red pigments include C.I. Pigment Reds 17, 49:2, 112, 177, 178, 188, 255, 264 and 149.

Violet pigment(s) giving a hue angle corresponding to a mixed color between the magenta ink composition and the cyan ink composition can be suitably used as colorant(s) in a violet ink composition (V). Examples of such violet pigments include C.I. Pigment Violets 3, 19, 23, 32, 36 and 38.

Black pigment(s) can be suitably used as colorant(s) in a black ink composition (K). Examples of such black pigments include carbon black.

In addition to the above, the ink set of the present invention may contain a light yellow ink composition, a light magenta ink composition, a light cyan ink composition, a blue ink composition, a light black ink composition, a green ink composition, a dark yellow ink composition, an orange ink composition, and so on.

As the orange ink composition, one having a hue angle in a range of 30° to 80° as defined in the above-mentioned CIELAB color space is preferable.

As the blue ink composition, one having a hue angle in a range of 160° to 230° as defined in the above-mentioned CIELAB color space is preferable.

It is preferable for the lightness of the orange ink composition and the lightness of the blue ink composition to be lower than the lightness of the magenta ink composition and the lightness of the cyan ink composition respectively.

It is preferable for the chroma of the orange ink composition and the chroma of the blue ink composition to be higher than the chroma of the magenta ink composition and the chroma of the cyan ink composition respectively.

The colorant content in each of the ink compositions is preferably in a range of 0.1 to 20 wt %, more preferably in a range of 0.5 to 10 wt %. The colorant content is adjusted as appropriate in accordance with the type of the ink composition, for example whether the ink composition is a dark or light colored ink composition.

The clear ink composition and/or the colored ink compositions may if necessary further contain solvent(s), commonly used in water-based ink compositions for ink jet recording. Examples of solvents include 2-pyrrolidone, triethanolamine, and saccharide(s) or derivatives thereof. Specific examples of saccharides are monosaccharides, disaccharides, oligosaccharides (including trisaccharides and tetrasaccharides), and polysaccharides, with preferable examples including glucose, mannose, fructose, ribose, xylose, arabinose, galactose, aldonic acid, glucitol, sorbit, maltose, cellobiose, lactose, sucrose, trehalose, and maltotriose. Here, 'polysaccharides' is deemed to mean saccharides in the broad sense, including substances that exist widely in the natural world such as alginic acid, α-cyclodextrin and cellulose. Moreover, derivatives of these saccharides include reducing sugars thereof (for example, sugar alcohols (represented by the general formula $HOCH_2(CHOH)_nCH_2OH$ (wherein n is an integer from 2 to 5 inclusive)), oxidized sugars (for example, aldonic acid, uronic acid, etc.), amino acids, and thiosugars). Sugar alcohols are particularly preferable, with specific examples including maltitol and sorbit. Moreover, for example HS-300 and 500 (registered trademarks, Hayashibara Shoji) which is commercially sold can be procured.

Moreover, the clear ink composition and/or the colored ink compositions may further contain auxiliaries. Examples of such auxiliaries include pH regulators, chelating agents, preservatives, corrosion inhibitors, antioxidants, ultraviolet absorbers, oxygen absorbers, and friction resistance improvers.

Another ink set of the present invention comprises a clear ink composition that contains polymer fine particles and contains up to 0.4 wt % of a colorant, and at least a yellow ink composition, a magenta ink composition, and a cyan ink composition.

If recording is carried out using such an ink set that contains a clear ink composition that contains a very small amount of 0.4 wt % or less of a colorant, then effects as a clear ink composition can be exhibited, and moreover images can be obtained for which gradation is yet more distinct and color variation is suppressed.

The colorant contained in the above-mentioned clear ink composition is preferably carbon black. By including carbon black, images having yet more distinct gray scale gradation can be obtained. Specifically, in the case of being affected by the external environment (for example, if the temperature changes, then the viscosities of the inks change, and if printing is carried out in this state, then the amounts discharged of the inks change, and hence the hue changes), change in the gray scale is readily perceived by the eye, and hence it is important to make the color variation low, and by including carbon black the gray scale color variation can be suppressed. Moreover, because the clear ink composition contains carbon black, which is a achromatic, the color does not change even if the discharge amount fluctuates somewhat, and the clear ink composition can be used even in parts having high lightness, and thus color variation can be further suppressed.

An ink cartridge of the present invention houses an ink set as described above.

Furthermore, a description will now be given of an ink jet recording method of the present invention. In the ink jet recording method of the present invention, using a clear ink composition as described above, and a yellow ink composition, a magenta ink composition and a cyan ink composition, or using an ink set as described above, recording is carried out by attaching the various ink compositions onto a recording medium.

By carrying out printing using an ink set as described above, the glossiness of the colored inks can be markedly improved with specialist paper in particular. By attaching the clear ink composition in parts where printing is not carried out using the colored ink compositions and low-duty parts, the glossiness of these unprinted parts and low-duty parts can be improved. In the recording method, it is preferable for each duty of the clear ink composition on the recording medium to be lower than each duty of the colored ink compositions. By attaching a small amount of the clear ink composition, the coloration can be further improved.

In the above recording method, it is preferable to adjust the amount discharged of the clear ink composition in accordance with the ink duty of the colored ink compositions.

In the recording method, it is preferable to attach the clear ink composition to parts of the recording medium where the duty value of the colored ink compositions is not more than a target duty value, such that the sum of the duty value of the colored ink compositions and the duty value of the clear ink composition is at least the target duty value.

By carrying out recording in this way, in the case that specialist glossy paper having a resin coating layer (PM photographic paper, etc.) is used as the recording medium, a recorded article having excellent recorded image coloration and glossiness can be obtained.

The target duty value is preferably 40%. By carrying out recording in this way, ink flooding under low temperature and high humidity can be prevented.

Alternatively, in the above recording method, the clear ink composition may be attached to all regions of the recording medium surface with a constant duty value, unrelated to the duties of the colored ink compositions on the recording medium.

By carrying out recording in this way, in the case of using plain paper not having a resin coating layer as the recording medium, a recorded article having excellent recorded image coloration can be obtained.

In particular, it is preferable to attach the clear ink composition at a constant duty of not more than 20% (e.g. 10%) to all regions of the recording medium surface on which recording has been carried out using the colored ink compositions. That is, it is preferable for the above-mentioned constant duty value to be a constant duty value of not more than 20% duty. By making the constant duty value be not more than 20% duty, warping and wrinkling of the recording medium can be prevented effectively.

By using a recording method as described above, a recorded article having both good coloration and good glossiness of recorded images can be obtained.

Note that in the above recording method, the clear ink composition and the colored ink compositions may also be discharged during the same process. Here 'during the same process' refers to the case that a specific image is formed using both the clear ink composition and the colored ink compositions within a single recording pass. 'During the same process' thus includes the case that the clear ink composition and the colored ink compositions are discharged completely simultaneously, and also the case that within a single pass the colored ink compositions are first discharged and then the clear ink composition is discharged, and the case that within a single pass the clear ink composition is first discharged and then the colored ink compositions are discharged.

EXAMPLES

Next, the present invention will be described in a more concrete fashion through examples; however, the present invention is not limited whatsoever by these examples.

Examples I (Preparation of Emulsion D)

55 parts by weight of ethyl acrylate, 37 parts by weight of methyl acrylate, 6 parts by weight of methacrylic acid, 3 parts by weight of octyl thioglycolate as a molecular weight regulator, 2.5 parts by weight of a polyvinyl alcohol, and 280 parts by weight of ion exchange water were mixed together with stirring, thus preparing a monomer mixture dispersion.

Next, 130 parts by weight of ion exchange water and 2 parts by weight of potassium persulfate were put into a reaction vessel equipped with a stirrer, the temperature was raised to 80° C., and the above monomer mixture dispersion was added continuously over 4 hours, thus carrying out polymerization. After the addition had been completed, reaction was carried out for 30 minutes at 80° C.

Next, an amount of a 10% sodium hydroxide aqueous solution containing a number of moles of sodium hydroxide equal to the number of moles of methacrylic acid put in was added to the reaction vessel, and heat treatment was carried out at 80° C. for 1 hour, and then a suitable amount of ion exchange water was added, whereby a resin having a solid content of 15% was obtained. The acid value of the resin was 40, and the pH was 9.2.

(Preparation of Emulsion C)

(1) 100 g of dioxane was put into a glass reaction vessel, 11.8 g of sulfuric anhydride was added thereto while maintaining the temperature inside the vessel at 25° C., and stirring was carried out for 2 hours, thus obtaining a sulfuric anhydride-dioxane complex.

(2) Next, all of the complex obtained in (1) above was added into a THF solution containing 100 g of a styrene/isoprene/styrene ternary block copolymer (10/80/10 weight ratio, Mw=100,000) (concentration of copolymer in THF: 15%) while maintaining the temperature inside the vessel at 25° C., and stirring was continued for a further 2 hours.

(3) 1200 g of water, 7.1 g of sodium hydroxide, and 1 g of sodium dodecyl benzenesulfonate were put into a flask, and the temperature inside the flask was maintained at 40° C. All of the solution obtained in (2) above was instilled into the flask over 1 hour while maintaining the temperature inside the flask at 40° C. After the instillation, stirring was carried out at 40° C. for 2 hours, and then the solvent was removed while leaving the water behind through distillation under reduced pressure, whereby a 15% concentration sulfonated polymer emulsion C was obtained. The sulfonic acid content in the solid component was 1.2 mmol/g.

(Preparation of Emulsion A)

100 ml of ion exchange water and 0.1 g of potassium persulfate were put into a flask equipped with a stirrer, a thermometer, a reflux condenser and a dropping funnel, and the flask was heated while stirring under a nitrogen atmosphere until the temperature inside the flask reached 70° C. Moreover, separately, 100 ml of ion exchange water, 1.0 g of sodium dodecyl benzenesulfonate, 30 g of styrene, 55 g of 2-ethylhexyl acrylate, and 5 g of methacrylic acid were put into a reaction vessel, and stirring was carried out, thus preparing an emulsion. After that, the emulsion was gradually instilled into the above-mentioned flask using the dropping funnel, thus preparing an emulsion containing polymer fine particles as a dispersoid. The emulsion was cooled down to room temperature, and was then filtered using a 0.4 μm filter, and then distilled water was added such that the concentration of the polymer fine particles became 30%, whereby an emulsion A was obtained. The glass transition temperature Tg of the emulsion A (as measured in accordance with JIS K6900) was less than 20° C.

Clear inks and colored inks having the undermentioned compositions were prepared.

| (Clear ink (1)) | |
| --- | --- |
| Emulsion D (in terms of solids) | 1.0 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |
| (Clear ink (2)) | |
| Emulsion C (in terms of solids) | 1.0 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |
| (Clear ink (3)) | |
| Emulsion A (in terms of solids) | 1.0 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |

-continued

| | |
|---|---|
| TEA (triethanolamine) | 1.0 wt % |
| Water | Remainder |
| Total | 100 wt % |

The surface tension of each of the above-mentioned clear ink compositions was measured using a CBVP-Z made by Kyowa Interface Science Co., Ltd., whereupon each of the clear ink compositions had a surface tension in a range of 25 to 35 dyn/cm.

(Magenta ink (5))

| | |
|---|---|
| Pigment (PR202) | 1.5 wt % |
| Styrene-acrylic copolymer resin (in terms of solids) | 0.5 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |

(Yellow ink (6))

| | |
|---|---|
| Pigment (PY74) | 3.0 wt % |
| Styrene-acrylic copolymer resin (in terms of solids) | 1.0 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |

(Cyan ink (7))

| | |
|---|---|
| Pigment (PB15:3) | 1.5 wt % |
| Styrene-acrylic copolymer resin (in terms of solids) | 0.5 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt% |

(Red ink (8))

| | |
|---|---|
| Pigment (PR178) | 2.0 wt % |
| Styrene-acrylic copolymer resin (in terms of solids) | 0.7 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |

(Violet ink (9))

| | |
|---|---|
| Pigment (PV23) | 2.0 wt % |
| Styrene-acrylic copolymer resin (in terms of solids) | 0.7 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |

(Magenta ink (10))

| | |
|---|---|
| Pigment (PR202) | 6.0 wt % |
| Styrene-acrylic copolymer resin (in terms of solids) | 2.0 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |

(Yellow ink (11))

| | |
|---|---|
| Pigment (PY74) | 6.0 wt % |
| Styrene-acrylic copolymer resin (in terms of solids) | 2.0 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |

(Cyan ink (12))

| | |
|---|---|
| Pigment (PB15:3) | 4.0 wt % |
| Styrene-acrylic copolymer resin (in terms of solids) | 1.3 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |

(Black ink (13))

| | |
|---|---|
| Pigment (carbon black) | 2.0 wt % |
| Styrene-acrylic copolymer resin (in terms of solids) | 2.0 wt % |
| Olfine E1010 | 0.5 wt % |
| Glycerol | 20 wt % |
| Ethylene glycol | 20 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |

The colored/black inks (5) to (13) and the clear inks (1) to (3) were combined to produce ink sets as shown in Table 1.

TABLE 1

| | Magenta | Yellow | Cyan | Red | Violet | Black | Clear |
|---|---|---|---|---|---|---|---|
| Ink Set A | (10) | (11) | (12) | — | — | — | (1) |
| Ink set B | (5) | (6) | (7) | — | — | (13) | (2) |
| Ink set C | (5) | (6) | (7) | (8) | (9) | (13) | (1) |
| Ink set D | (5) | (6) | (7) | (8) | (9) | (13) | (2) |
| Ink set E | (5) | (6) | (7) | (8) | (9) | (13) | (3) |
| Ink Set F (comparative example) | (10) | (11) | (12) | — | — | — | — |
| Ink Set G (comparative example) | (5) | (6) | (7) | — | — | (13) | — |
| Ink Set H (comparative example) | (5) | (6) | (7) | (8) | (9) | (13) | — |

[Glossiness Tests Using PM Photographic Paper]

For each of the ink sets in Table 1, printing was carried out at 720×720 dpi on ink jet specialist paper (PM photographic paper made by Seiko Epson Corporation) using an ink jet printer (MC-2000 made by Seiko Epson Corporation). The ink discharge stability in each case was good.

The printed patterns used consisted of single-color parts for each of the colored/black inks, and mixed color parts where two or more of the colored/black inks were used together, with the total duty being adjusted to 0% (unprinted parts), 10%, 20%, 40% or 100%.

Moreover, in the case of using a clear ink, both of the following cases were carried out:
1. Clear printing duty 20% case: In parts where printing duty 20% or less, clear ink attached at uniform 20% duty
2. Clear printing duty 40% case: In parts where printing duty 40% or less, clear ink attached at uniform 40% duty.

The glossiness for each of the recorded articles obtained was tested as follows. The maximum value of the glossiness was measured using a GP-200 made by Murakami Color Research Laboratory, under conditions of 12V, 50W, an incident light beam aperture diameter of 1 mm, a reflected light aperture diameter of 1.5 mm, an ND10 filter, an angle of incidence of 45°, a tilt angle of 0°, and a 42.5 standard specular plate. The higher the maximum value of the glossiness, the higher the glossiness bestowing ability.

(Evaluation Criteria)
A: Maximum glossiness at least 40
B: Maximum glossiness at least 30 but less than 40
C: Maximum glossiness at least 20 but less than 30
D: Maximum glossiness at least 10 but less than 20
E: Maximum glossiness less than 10

Furthermore, a human image as stipulated in ISO400 was printed using the same printing method as above, and the state of the glossiness was judged visually using the following evaluation criteria.

(Evaluation Criteria)
Excellent: Uniform high glossy sensation obtained.
Good: Fairly uniform glossy sensation obtained, but some places with low glossiness present, and slight feeling of incongruity felt.
Poor: Glossiness not constant, feeling of incongruity felt.

The results of the evaluations using the above evaluation criteria are shown in Table 2.

As shown in Table 2, by attaching a clear ink, the glossiness of unprinted parts (0% duty parts) was improved.

Furthermore, the glossiness of low-duty parts was improved by attaching a clear ink, and the difference in glossiness between low-duty parts and high-duty parts was reduced.

This effect of regulating the state of glossiness using a clear ink is marked in the case of using an ink set comprising inks having relatively low pigment concentrations. Moreover, it can be seen that using a clear ink is more effective in the case of image printing using an ink set in which special colors such as red and violet have been added to the four basic colors yellow, magenta, cyan and black than in the case of image printing using only these four basic colors. The reason for this is not certain, but it is thought that it is due to the overall printing duty being reduced in the case that images are printed with the special colored inks added to the ink set. (Explanation of '*' in Table 2: it is thought that a slight feeling of incongruity arose because the overall printing duty was high.)

Examples II

Clear inks and colored inks having the undermentioned compositions were prepared.

Note that in the following, Aquacer 593 is a modified polypropylene emulsion made by BYK Chemie Japan, emulsions C and D are as earlier, Aquacer 498 is a paraffin wax-based emulsion made by BYK Chemie Japan, Joncryl 61J is a styrene-acrylic resin (resin component 30.5%) made by Johnson Polymer Co., and MA-100B is a carbon black made by Mitsubishi Chemical Corporation.

| (Clear ink (1)) | |
| --- | --- |
| Aquacer 593 (in terms of solids) | 1.0 wt % |
| Glycerol | 18 wt% |
| Ethylene glycol | 8.0 wt % |
| Olfine E1010 | 1.0 wt % |
| Triethylene glycol monobutyl ether | 5.0 wt % |
| Pure water | Remainder |
| Total | 100 wt % |

TABLE 2

| | Clear printing duty | 0% (un-printed Parts) | 10% | 20% | 40% | 100% | State of glossiness |
| --- | --- | --- | --- | --- | --- | --- | --- |
| Ink Set A | 20% | B | B | A | D | D | Good |
| | 40% | A | A | A | D | D | Good |
| Ink Set B | 20% | B | B | A | A | A | Good |
| | 40% | A | A | A | A | A | Good(*) |
| Ink Set C | 20% | B | B | A | A | A | Good |
| | 40% | A | A | A | A | A | Excellent |
| Ink Set D | 20% | B | B | A | A | A | Good |
| | 40% | A | A | A | A | A | Excellent |
| Ink Set E | 20% | B | B | A | A | A | Good |
| | 40% | A | A | A | A | A | Excellent |
| Ink Set F (comparative example) | — | E | C | C | D | D | Poor |
| Ink Set G (comparative example) | — | E | B | B | A | A | Poor |
| Ink Set H (comparative example) | — | E | B | B | A | A | Poor |

-continued (Clear ink (2))

| | |
|---|---|
| Emulsion C (in terms of solids) | 1.0 wt % |
| Glycerol | 17 wt % |
| Ethylene glycol | 8.0 wt % |
| Olfine E1010 | 1.0 wt % |
| Triethylene glycol monobutyl ether | 5.0 wt % |
| Pure water | Remainder |
| Total | 100 wt % |

(Clear ink (3))

| | |
|---|---|
| Emulsion D (in terms of solids) | 1.0 wt % |
| Glycerol | 18 wt % |
| Ethylene glycol | 8.0 wt % |
| Olfine E1010 | 1.0 wt % |
| Triethylene glycol monobutyl ether | 5.0 wt % |
| Pure water | Remainder |
| Total | 100 wt % |

(Clear ink (4))

| | |
|---|---|
| Joncryl 61J (in terms of solids) | 1.0 wt % |
| Glycerol | 15 wt % |
| Ethylene glycol | 8.0 wt % |
| Olfine E1010 | 1.0 wt % |
| Triethylene glycol monobutyl ether | 5.0 wt % |
| Pure water | Remainder |
| Total | 100 wt % |

(Clear ink (5))

| | |
|---|---|
| Aquacer 498 (in terms of solids) | 1.0 wt % |
| Glycerol | 18 wt % |
| Ethylene glycol | 8.0 wt % |
| Olfine E1010 | 1.0 wt % |
| Triethylene glycol monobutyl ether | 5.0 wt % |
| Pure water | Remainder |
| Total | 100 wt % |

(Yellow ink)

| | |
|---|---|
| Pigment (PY74) | 3.5 wt % |
| Dispersant (Joncryl 61J) (in terms of solids) | 1.8 wt % |
| Glycerol | 13 wt % |
| Ethylene glycol | 3.0 wt % |
| Olfine E1010 | 0.7 wt % |
| Triethylene glycol monobutyl ether | 5.0 wt % |
| Pure water | Remainder |
| Total | 100 wt % |

(Magenta ink)

| | |
|---|---|
| Pigment (PR202) | 3.0 wt % |
| Dispersant (Joncryl 61J) (in terms of solids) | 1.5 wt % |
| Glycerol | 13 wt % |
| Ethylene glycol | 3.0 wt % |
| Olfine E1010 | 0.6 wt % |
| Triethylene glycol monobutyl ether | 5.0 wt % |
| Pure water | Remainder |
| Total | 100 wt % |

(Cyan ink)

| | |
|---|---|
| Pigment (PB15:3) | 2.5 wt % |
| Dispersant (Joncryl 61J) (in terms of solids) | 1.2 wt % |
| Glycerol | 15 wt % |
| Ethylene glycol | 3.0 wt % |
| Olfine E1010 | 0.7 wt % |
| Triethylene glycol monobutyl ether | 5.0 wt % |
| Pure water | Remainder |
| Total | 100 wt % |

(Black ink)

| | |
|---|---|
| Pigment (carbon black MA-100B) | 3.0 wt % |
| Dispersant (Joncryl 61J) (in terms of solids) | 1.5 wt % |
| Glycerol | 12 wt % |
| Ethylene glycol | 4.0 wt % |
| Olfine E1010 | 0.5 wt % |
| Triethylene glycol monobutyl ether | 5.0 wt % |
| Pure water | Remainder |
| Total | 100 wt % |

The above-mentioned inks of the four colors yellow, magenta, cyan and black were filled into the colored ink cartridge of a PM-800C ink jet printer (made by Seiko Epson Corporation), and one of the clear inks (1) to (5) was filled into the black ink cartridge, and printing was carried out on ink jet specialist paper (PM photographic paper made by Seiko Epson Corporation).

The recorded patterns were made to consist of single-color parts for the yellow, magenta, cyan and black inks and each of the clear inks, and two-ink mixed color parts of the colors red (yellow+magenta), green (yellow+cyan) and blue (magenta+cyan), with total recording duties of 0% (un-printed parts), 10% (5% for each ink in the case of mixing two inks), 20% (10% for each ink in the case of mixing two inks), and then 10% intervals up to 100% (50% for each ink in the case of mixing two inks).

Moreover, each of the recorded patterns was printed over a 50 mm×50 mm region, and the recording was carried out using 'fine' mode, which is the recommended setting for PM photographic paper, with a printer driver as the printing method.

[Glossiness Ratio]

The glossiness at 60° for each color at each duty was measured using a PG-1M gloss meter (made by Nippon Denshoku Industries Co., Ltd.). The glossiness ratio, which is the ratio between the maximum glossiness and the minimum glossiness, was calculated for each color, and the extent of variation in glossiness due to differences in duty was evaluated for each color using the following criteria.

A: Glossiness ratio at least 1.0 but less than 1.3

B: Glossiness ratio at least 1.3 but less than 1.5

C: Glossiness ratio 1.5 or more

[Glossiness of Each Clear Ink Itself]

The glossiness at 60° of the clear ink 100% and 40% duty parts were measured using a PG-1M gloss meter (made by Nippon Denshoku Industries Co., Ltd.), and evaluation was carried out as follows.

A: Glossiness at least 80

B: Glossiness at least 50 but less than 80

C: Glossiness less than 50

[Printing Stability]

Each clear ink was filled into the black ink cartridge of a PM-800C ink jet printer (made by Seiko Epson Corporation), and a character pattern was printed continuously. It was then observed whether or not there was dot omission and ink scattering 10 hours after commencement of the printing. The results were evaluated using the following criteria.

A: Dot omission and ink scattering occurred 5 or fewer times, recovery from dot omission and ink scattering achieved upon cleaning.

B: Dot omission and ink scattering occurred 6 to 10 times, recovery from dot omission and ink scattering achieved upon cleaning.

C: Dot omission and ink scattering occurred 6 to 10 times, recovery from dot omission and ink scattering not achieved upon cleaning.

The results of the evaluations using the above evaluation criteria are shown in Table 3.

TABLE 3

|  |  | Example 1 | Example 2 | Example 3 | Example 4 | Example 5 | Comparative Example 1 |
|---|---|---|---|---|---|---|---|
| Clear ink | | (1) | (2) | (3) | (4) | (5) | none |
| Glossiness ratio | Y | A | A | A | A | A | C |
| | M | A | A | A | A | A | C |
| | C | A | A | A | A | A | C |
| | K | A | A | A | A | A | B |
| | R(Y + M) | A | A | A | B | B | C |
| | G(Y + C) | A | A | A | A | B | C |
| | B(M + C) | A | A | A | B | B | C |
| Glossiness of clearink | 100% duty | A | A | A | B | C | C |
| | 40% duty | A | B | B | C | C | C |
| Printing stability | | A | B | B | C | C | — |

As shown in Table 3, with Examples 1 to 5, the glossiness and the printing stability were improved compared with Comparative Example 1. Moreover, with Example 1 in which clear ink (1) containing a modified polypropylene emulsion was used, Example 2 in which clear ink (2) containing emulsion C was used, Example 3 in which clear ink (3) containing emulsion D was used, and Example 4 in which clear ink (4) containing an alkali-soluble resin was used, unevenness in the glossiness according to the printing duty was further reduced compared with Example 5. In this way, with Examples 1 to 4, unevenness in the glossiness according to the printing duty can be reduced, and moreover because the glossiness is high even at low duty, the ink firing amounts can be reduced. The effect of reducing unevenness in the glossiness was particularly marked with Example 1.

Moreover, the printing stability was also good with Examples 1 to 3, in particular with Example 1.

Examples III

A clear ink having the undermentioned composition was prepared.

(Clear ink (6))

| Pigment (carbon black MA-100B) | 0.08 wt % |
|---|---|
| Aquacer 593 (in terms of solids) | 1.0 wt % |
| Dispersant (Joncryl 61J) (in terms of solids) | 0.04 wt % |
| Glycerol | 18 wt % |
| Ethylene glycol | 8.0 wt % |
| Olfine E1010 | 1.0 wt % |
| Triethylene glycol monobutyl ether | 5.0 wt % |
| Pure water | Remainder |
| Total | 100 wt % |

The inks of the four colors yellow, magenta, cyan and black described in Examples II above, and the clear ink (6) were filled into the cartridges of a PM-800C ink jet printer (made by Seiko Epson Corporation), and printing and evaluation were carried out as in Examples II.

The results are shown in Table 4.

TABLE 4

| Clear ink | | Example 6 (6) |
|---|---|---|
| Glossiness ratio | Y | A |
| | M | A |
| | C | A |

TABLE 4-continued

| Clear ink | | Example 6 (6) |
|---|---|---|
| | K | A |
| | R (Y + M) | A |
| | G (Y + C) | A |
| | B (M + C) | A |
| Glossiness of clear ink | 100% duty | A |
| | 40% duty | A |
| Printing stability | | A |

As shown in FIG. 4, with Example 6 in which clear ink (6) containing a very small amount of carbon black was used, unevenness in the glossiness according to the printing duty was further reduced, and the printing stability was also excellent.

Furthermore, for Examples 1 and 6, an evaluation of color variation was also carried out as follows.

[Evaluation of Color Variation]

The yellow ink, the magenta ink, the cyan ink and the clear ink were filled into the yellow ink chamber, the magenta ink chamber, the cyan ink chamber and the light magenta ink chamber respectively (the light cyan ink chamber was not used) of the colored ink cartridge of a PM-800C ink jet printer (made by Seiko Epson Corporation), and a black ink was filled into the black ink cartridge.

For the evaluation, a gray scale having patches of 18 gradations from white to black was outputted onto MC photographic paper (made by Seiko Epson Corporation). Printing was carried out with the driver newly optimized (with regard to the proportions used of the various colors, the ink discharge amounts, etc.) such that the optimum gray scale was outputted (standard printing). Moreover, the gray scale was outputted with the ink weight for each of the inks changed by 10% one ink at a time (printing with changes) Each of the outputted patches was subjected to measurement using a Gretag SPM spectrophotometer (made by Gretag); color measurements were taken for the standard printing and the printing with changes using the L*a*b* color system of the color difference representation method stipulated by the CIE. The measurement conditions were made to be a D50 light source, no light source filter, absolute white as the white standard, and an angle of view of 2°.

The difference $\Delta E$ ($\Delta E = (\Delta L^*)^2 + (\Delta a^*)^2 + (\Delta b^*)^2$) between the standard printing and the printing with changes was calculated, and evaluation was carried out using the following criteria.

A: ΔE not more than 2 for all patches.
B: ΔE exceeds 2 for up to 10% of the patches, but ΔE not more than 2 for remaining 90% or more of the patches.
C: ΔE exceeds 2 for up to 50% of the patches.
D: ΔE exceeds 2 for up to 70% of the patches.

The result of evaluating the color variation according to the above criteria was 'A' for Example 6, and 'C' for Example 1. It can thus be seen that with Example 6, by using clear ink (6) which contains a very small amount of a colorant, an effect of suppressing color variation can also be obtained.

Examples IV

Clear inks (A) to (C) having the undermentioned compositions were prepared.

| (Clear ink (A)) | |
| --- | --- |
| Emulsion D (in terms of solids) | 1.0 wt % |
| Aquacer 593 (in terms of solids) | 1.0 wt % |
| Olfine E1010 | 0.5 wt % |
| Glycerol | 20 wt % |
| Ethylene glycol | 15 wt % |
| 1,2-hexanediol | 5.0 wt % |
| 2-pyrrolidone | 2.0 wt% |
| TEA (triethanolamine) | 1.0 wt % |
| Water | Remainder |
| Total | 100 wt % |
| (Clear ink (B)) | |
| Emulsion C (in terms of solids) | 1.0 wt % |
| Aquacer 593 (in terms of solids) | 1.0 wt% |
| Olfine E1010 | 0.5 wt % |
| Glycerol | 20 wt % |
| Ethylene glycol | 15 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |
| (Clear ink (C)) | |
| Emulsion A (in terms of solids) | 1.0 wt % |
| Aquacer 593 (in terms of solids) | 1.0 wt % |
| Olfine E1010 | 0.5 wt % |
| Glycerol | 20 wt % |
| Ethylene glycol | 15 wt % |
| 1,2-hexanediol | 5.0 wt % |
| 2-pyrrolidone | 2.0 wt % |
| TEA (triethanolamine) | 1.0 wt % |
| Water | Remainder |
| Total | 100 wt % |

The clear inks (A) to (C), and the colored inks (5) to (13) described in Examples I earlier were combined to produce ink sets as shown in Table 5.

TABLE 5

| | Magenta | Yellow | Cyan | Red | Violet | Black | Clear |
| --- | --- | --- | --- | --- | --- | --- | --- |
| Ink Set IV-A | (10) | (11) | (12) | — | — | — | (A) |
| Ink Set IV-B | (5) | (6) | (7) | — | — | (13) | (B) |
| Ink Set IV-C | (5) | (6) | (7) | (8) | (9) | (13) | (A) |
| Ink Set IV-D | (5) | (6) | (7) | (8) | (9) | (13) | (B) |
| Ink Set IV-E | (5) | (6) | (7) | (8) | (9) | (13) | (C) |

For each of the ink sets of Table 5, printing and evaluation were carried out as in Examples I. The results are shown in Table 6.

TABLE 6

| Ink set | Clear printing duty | 0% (unprinted parts) | 10% | 20% | 40% | 100% | State of glossiness |
| --- | --- | --- | --- | --- | --- | --- | --- |
| IV-A | 20% | B | B | A | D | D | Good |
| | 40% | A | A | A | D | D | Good |
| IV-B | 20% | B | B | A | A | A | Good |
| | 40% | A | A | A | A | A | Good |
| IV-C | 20% | B | B | A | A | A | Good |
| | 40% | A | A | A | A | A | Excellent |
| IV-D | 20% | B | B | A | A | A | Good |
| | 40% | A | A | A | A | A | Excellent |
| IV-E | 20% | B | B | A | A | A | Good |
| | 40% | A | A | A | A | A | Excellent |

As shown in FIG. 6, the glossiness of unprinted parts was improved by attaching the clear inks (A) to (C). Moreover, the glossiness of low-duty parts was improved by attaching the clear inks, and hence the difference in glossiness between low-duty parts and high-duty parts was reduced.

According to the clear ink composition, the ink set, the ink cartridge and the ink jet recording method of the present invention, a high-quality recorded article having excellent recorded image coloration and glossiness can be obtained.

By using the ink set and so on of the present invention, in the case of using glossy paper in particular, the clear ink composition can be attached in parts where printing is not carried out using the colored ink compositions and low-duty parts, whereby the glossiness of these unprinted parts and low-duty parts can be improved.

By using the ink set and so on of the present invention, a good state of glossiness with no unevenness can thus be realized.

What is claimed is:

1. A clear ink composition, which contains polymer fine particles, and does not contain a colorant or contains a colorant in an amount of not more than 0.4 wt % such that the ink composition is clear, wherein said polymer fine particles are polymer fine particles of at least one type selected from the group consisting of (i) sulfonic acid group-containing polymers, (ii) modified polypropylene emulsions, (iii) copolymers obtained by polymerizing, in the presence of an alcoholic hydroxyl group-containing water-soluble macromolecular compound or a copolymerizable surfactant, an ethylenic unsaturated carboxylic acid monomer and another monomer copolymerizable therewith, and (iv) emulsified resins having a particle diameter of at least 70 nm, wherein said polymer fine particles comprise the modified polypropylene emulsions which are obtained by modifying a polypropylene having a weight average molecular weight Mw in a range of 1,000 to 50,000 inclusive with an unsaturated carboxylic acid or an anhydride thereof, and then dispersing the modified polypropylene in the presence of a basic compound and an emulsifier.

2. The clear ink composition according to claim 1, wherein said unsaturated carboxylic acid is maleic acid and/or maleic anhydride.

3. An ink jet recording method, comprising discharging the clear ink composition according to claim 1 onto a recording medium, wherein an amount discharged of the clear ink composition is adjusted in accordance with an ink duty of colored ink compositions on the recording medium.

4. A clear ink composition, which contains polymer fine particles, and does not contain a colorant or contains a colorant in an amount of not more than 0.4 wt % such that the ink composition is clear, wherein said polymer fine particles are polymer fine particles of at least one type selected from the group consisting of (i) sulfonic acid group-containing polymers, (ii) modified polypropylene emulsions, (iii) copolymers obtained by polymerizing, in the presence of an alcoholic hydroxyl group-containing water-soluble macromolecular compound or a copolymerizable surfactant, an ethylenic unsaturated carboxylic acid monomer and another monomer copolymerizable therewith, and (iv) emulsified resins having a particle diameter of at least 70 nm, wherein said polymer fine particles comprise said copolymers which are obtained by polymerizing, in the presence of an alcoholic hydroxyl group-containing water-soluble macromolecular compound or a copolymerizable surfactant, an ethylenic unsaturated carboxylic acid monomer and another monomer copolymerizable therewith wherein the copolymers have an acid value of not more than 40.

5. The clear ink composition according to claim 4, wherein said copolymers obtained by polymerizing, in the presence of an alcoholic hydroxyl group-containing water-soluble macromolecular compound or a copolymerizable surfactant, an ethylenic unsaturated carboxylic acid monomer and another monomer copolymerizable therewith have had the pH thereof adjusted using a base.

6. The clear ink composition according to claim 5, wherein said base is an inorganic base.

7. The clear ink composition according to claim 6, wherein said inorganic base is an alkali metal hydroxide or an alkaline earth metal hydroxide.

8. The clear ink composition according to claim 4, wherein said copolymers have a glass transition temperature Tg as measured in accordance with JIS K6900 of not more than 70° C.

9. The clear ink composition according to claim 4, wherein said alcoholic hydroxyl group-containing water-soluble macromolecular compound is a vinyl alcohol compound.

10. The clear ink composition according to claim 4, wherein said ethylenic unsaturated carboxylic acid monomer is acrylic acid or methacrylic acid.

11. The clear ink composition according to claim 4, wherein said other monomer copolymerizable with said ethylenic unsaturated carboxylic acid monomer is an ethylenic unsaturated carboxylic acid ester monomer.

12. The clear ink composition according to claim 4, wherein said polymer fine particles have a weight average molecular weight Mw in a range of 1,000 to 1,000,000 inclusive.

13. The clear ink composition according to claim 4, wherein said polymer fine particles have a weight average molecular weight Mw in a range of 8,000 to 20,000 inclusive.

14. The clear ink composition according to claim 4, wherein said polymer fine particles have a pH in a range of 8 to 11 inclusive.

15. The clear ink composition according to claim 4, wherein said polymer fine particles have a pH in a range of 9 to 10 inclusive.

16. The clear ink composition according to claim 4, wherein said polymer fine particles have a turbidity of not more than 30 mg/l.

17. The clear ink composition according to claim 4, wherein said polymer fine particles have a minimum film formation temperature MFT of not more than 20° C.

18. The clear ink composition according to claim 1 or 4, wherein the content of said polymer fine particles is in a range of 0.05 wt % to 10.0 wt % inclusive of the clear ink composition.

19. The clear ink composition according to claim 1 or 4, having a surface tension in a range of 15 dyn/cm to 45 dyn/cm inclusive.

20. An ink set, comprising the clear ink composition according to claim 1 or 4, and at least a yellow ink composition, a magenta ink composition, and a cyan ink composition.

21. The ink set according to claim 20, further comprising a red ink composition having a hue angle corresponding to a mixed color between said yellow ink composition and said magenta ink composition.

22. The ink set according to claim 20, further comprising a violet ink composition having a hue angle corresponding to a mixed color between said magenta ink composition and said cyan ink composition.

23. The ink set according to claim 20, further comprising a black ink composition.

24. An ink cartridge, housing the ink set according to claim 20.

25. An ink set, comprising the clear ink composition according to claim 1 or 4 that contains a colorant in an amount of 0.4 wt % or less, and at least a yellow ink composition, a magenta ink composition, and a cyan ink composition.

26. The ink set according to claim 25, wherein the colorant contained in said clear ink composition is carbon black.

27. An ink set comprising (a) a clear ink composition, which contains polymer fine particles, and does not contain a colorant or contains a colorant in an amount of not more than 0.4 wt % such that the ink composition is clear, wherein said polymer fine particles are polymer fine particles of at least one type selected from the group consisting of (i) sulfonic acid group-containing polymers, (ii) modified polypropylene emulsions, (iii) copolymers obtained by polymerizing, in the presence of an alcoholic hydroxyl group-containing water-soluble macromolecular compound or a copolymerizable surfactant, an ethylenic unsaturated carboxylic acid monomer and another monomer copolymerizable therewith, and (iv) emulsified resins having a particle diameter of at least 70 nm, wherein said sulfonic acid group-containing polymers are dienic sulfonic acid group-containing polymers and/or non-dienic sulfonic acid group-containing polymers, and wherein said sulfonic acid group-containing polymers have an acid value of at least 100; (b) a yellow ink composition, (c) a magenta ink composition, (d) a cyan ink composition, and (e) a red ink composition having a hue angle corresponding to a mixed color between said yellow ink composition and said magenta ink composition.

28. An ink set comprising (a) a clear ink composition, which contains polymer fine particles, and does not contain a colorant or contains a colorant in an amount of not more than 0.4 wt % such that the ink composition is clear, wherein said polymer fine particles are polymer fine particles of at least one type selected from the group consisting of (i) sulfonic acid group-containing polymers, (ii) modified polypropylene emulsions, (iii) copolymers obtained by polymerizing, in the presence of an alcoholic hydroxyl group-containing water-soluble macromolecular compound or a copolymerizable surfactant, an ethylenic unsaturated carboxylic acid monomer and another monomer copolymenzable therewith, and (iv) emulsified resins having a particle diameter of at least 70 nm, wherein said sulfonic acid group-containing polymers are dienic sulfonic acid group-containing polymers and/or non-dienic sulfonic acid group-containing polymers, and wherein said sulfonic acid group-containing polymers have a minimum film formation temperature MFT of not more than 20° C.; (b) a yellow ink composition, (c) a magenta ink composition, (d) a cyan ink composition, and (e) a red ink composition having a hue angle corresponding to a mixed color between said yellow ink composition and said magenta ink composition.

29. An ink set comprising (a) a clear ink composition, which contains polymer fine particles, and does not contain a colorant or contains a colorant in an amount of not more than 0.4 wt % such that the ink composition is clear, wherein said polymer fine particles are polymer fine particles of at least one type selected from the group consisting of (i) sulfonic acid group-containing polymers, (ii) modified polypropylene emulsions, (iii) copolymers obtained by polymerizing, in the presence of an alcoholic hydroxyl group-containing water-soluble macromolecular compound or a copolymerizable surfactant, an ethylenic unsaturated carboxylic acid monomer and another monomer copolymerizable therewith, and (iv) emulsified resins having a particle diameter of at least 70 nm, wherein said sulfonic acid group-containing polymers are dienic sulfonic acid group-containing polymers and/or non-dienic sulfonic acid group-containing polymers, and wherein said sulfonic acid group-containing polymers have a particle diameter of not more than 70 nm; (b) a yellow ink composition, (c) a magenta ink composition, (d) a cyan ink composition, and (e) a red ink composition having a hue angle corresponding to a mixed color between said yellow ink composition and said magenta ink composition.

30. An ink set comprising (a) a clear ink composition, which contains polymer fine particles, and does not contain a colorant or contains a colorant in an amount of not more than 0.4 wt % such that the ink composition is clear, wherein said polymer fine particles are polymer fine particles of at least one type selected from the group consisting of (i) sulfonic acid group-containing polymers, (ii) modified polypropylene emulsions, (iii) copolymers obtained by polymerizing, in the presence of an alcoholic hydroxyl group-containing water-soluble macromolecular compound or a copolymerizable surfactant, an ethylenic unsaturated carboxylic acid monomer and another monomer copolymerizable therewith, and (iv) emulsified resins having a particle diameter of at least 70 nm, wherein said polymer fine particles comprise said emulsified resins, said emulsified resins having a particle diameter of at least 70 nm and a glass transition temperature Tg as measured in accordance with JIS K6900 of not more than 20° C.; (b) a yellow ink composition, (c) a magenta ink composition, (d) a cyan ink composition, and (e) a red ink composition having a hue angle corresponding to a mixed color between said yellow ink composition and said magenta ink composition.

* * * * *